US 11,894,980 B2

(12) United States Patent
Tu (10) Patent No.: US 11,894,980 B2
(45) Date of Patent: Feb. 6, 2024

(54) NETWORK QUALITY DETECTION METHOD AND DEVICE, NETWORK ELEMENT DEVICE, COMPUTER DEVICE, AND COMPUTER READABLE MEDIUM (71) Applicant: ZTE CORPORATION, Guangdong (CN)

(72) Inventor: Jiqiang Tu, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 0 days.

(21) Appl. No.: 17/773,686

(22) PCT Filed: Oct. 27, 2020

(86) PCT No.: PCT/CN2020/124042
§ 371 (c)(1),
(2) Date: May 2, 2022

(87) PCT Pub. No.: WO2021/093574
PCT Pub. Date: May 20, 2021

(65) Prior Publication Data
US 2022/0385540 A1 Dec. 1, 2022

(30) Foreign Application Priority Data
Nov. 12, 2019 (CN) .......................... 201911101024.5

(51) Int. Cl.
H04L 12/24 (2006.01)
H04L 12/26 (2006.01)
(Continued)

(52) U.S. Cl.
CPC .......... H04L 41/12 (2013.01); H04L 41/0622 (2013.01); H04L 41/0677 (2013.01);
(Continued)

(58) Field of Classification Search
CPC . H04L 41/06; H04L 41/0604; H04L 41/0622; H04L 41/0677; H04L 41/12;
(Continued)

(56) References Cited

U.S. PATENT DOCUMENTS 7,296,194 B1 * 11/2007 Lovy .................. H04L 43/0805
709/224
2016/0294603 A1 * 10/2016 Whitner ................ H04L 43/024
(Continued)

FOREIGN PATENT DOCUMENTS

CN 110351160 A 10/2019

OTHER PUBLICATIONS

European Patent Office, EP20888282.9 Extended European Search Report dated Oct. 17, 2023.
(Continued)

Primary Examiner — Boris D Grijalva Lobos
(74) Attorney, Agent, or Firm — Li & Cai Intellectual Property (USA) Office (57) ABSTRACT A network quality detection method and device, a network element device, a computer device, and a computer readable medium. The method comprises: separately sending a subscription command to an ingress network element device and an egress network element device of a service flow, the subscription command comprising at least a detection type and a reporting period, so that network element devices bearing the service flow send data according to the detection type and the reporting period; receiving the data sent by the network element devices; determining the path of the service flow according to the data; and detecting the network quality of the path according to the data and a predetermined indicator threshold.

16 Claims, 4 Drawing Sheets (51) Int. Cl.
  *H04L 41/12*       (2022.01)
  *H04L 43/062*      (2022.01)
  *H04L 43/0811*     (2022.01)
  *H04L 41/0604*     (2022.01)
  *H04L 41/0677*     (2022.01)
  *H04L 43/026*      (2022.01)

(52) U.S. Cl.
  CPC .......... *H04L 43/026* (2013.01); *H04L 43/062* (2013.01); *H04L 43/0811* (2013.01)

(58) Field of Classification Search
  CPC ........... H04L 41/14; H04L 41/147–149; H04L 43/02; H04L 43/026
  See application file for complete search history.

(56) References Cited

U.S. PATENT DOCUMENTS

2017/0302546 A1\* 10/2017 Zheng .................... H04L 43/08
2019/0109776 A1\*  4/2019 Li ....................... H04L 41/0895
2019/0288938 A1   9/2019 Song
2020/0177550 A1\*  6/2020 Valluri ................ H04L 63/0209

OTHER PUBLICATIONS

Mizrahi, et al., "An Overview of Operations, Administration, and Maintenance (OAM) Tools draft-ietf-opsawg-oam-overview-14", Internet Engineering Task Force, IETF, Feb. 18, 2014.

\* cited by examiner

NETWORK QUALITY DETECTION METHOD AND DEVICE, NETWORK ELEMENT DEVICE, COMPUTER DEVICE, AND COMPUTER READABLE MEDIUM

CROSS-REFERENCE OF RELATED APPLICATIONS

This application is based on and claims the priority to Chinese Patent Application No. 201911101024.5, filed on Nov. 12, 2019, the entire contents of which are hereby incorporated herein by reference.

TECHNICAL FIELD

Embodiments of the present disclosure relate to the technical field of computer networks, and in particular, to a network quality detection method and device, network element device, computer device, and computer readable medium.

BACKGROUND

With the arrival of 5G (5th-Generation, the fifth-generation mobile technologies) communication network, the vertical industries have more demanding requirements for network indicators, bringing huge challenges to operation and maintenance of the bearer network. The characteristics that three layers of services have been extended to the access side allow the In-band OAM (Operation Administration and Maintenance) detection technologies to provide for the 5G network a more accurate and reliable means of maintenance. Fast, sensitive, real-time detection of changes in network quality indicators greatly reduces the time for network troubleshooting and service reduction, and can even be prepared to respond in advance according to the trend of indicator changes.

It is In-band OAM that the OAM information and data to be carried are directly encapsulated in the user data message and are sent along with the data message without additional control messages to send OAM data. In-band OAM can implement a variety of network fault detection functions, such as packet path consistency detection, POT (Path of Transit) proof, SLA detection. An edge node in the In-band OAM domain that embeds the In-band OAM data in the data message is also called an In-band OAM encapsulation node. An edge node in the In-band OAM domain that removes the OAM data message is also called an In-band OAM decapsulation node. Objects of the In-band OAM network quality detection can be SR (Segment Routing)-TP (Transport Profile)/TE (Traffic Engineering) tunnels, SR-BE (Best Effort) tunnels, or beared IP (Internet Protocol) service flows.

In-band detection schemes can provide smaller time granularity and a wider range of network quality indicators, and naturally will require higher processing power of the detection system and equipment, especially for up to 10,000 or even 100,000 orders of in-band detection tasks. More efficient algorithms and more intelligent processing technologies become particularly important.

The existing In-band detection schemes has the following shortcomings.

1. Excessive resource and time consumption. The background system needs to calculate all possible routes, PE (Provider Edge, i.e., the network edge) devices and P (Provider, i.e., the network core) devices for each service flow. If the number of service flows reaches the order of 10,000 or 100,000, a lot of resources may be consumed to calculate the routings using a long period of calculation time, which can reach ten minutes or even longer.

2. Real utilization of In-band OAM resources of a device is not high. For routes with secondary paths and complex paths, the background system needs to issue subscription commands for nodes on all possible paths of each service flow, but the service flow may only be transmitted on one of the paths. This may cause a large number of redundant subscription points and a lot of waste of the limited In-band OAM resources of the device.

3. Performance data errors. When the primary and secondary paths are reversed, the path of data collection is inconsistent with the issued subscribed path, and the path shown is not the real path.

4. Performance detection in some business scenarios cannot be carried out. For east-west eX2 business, as there is no tunnel entity, it is hard to calculate the routing data in advance when the business is beared in the SR-BE tunnel, and it is hard to know which devices to issue the subscription command to.

SUMMARY

In view of this, the disclosure provides a network quality detection method and device, a network element device, a computer device, and a computer readable medium.

In a first aspect, an embodiment of the disclosure provides a network quality detection method, including: sending a subscription command for instructing to detect a service flow to an ingress network element device and an egress network element device of the service flow, respectively, the subscription command carrying at least a detection type and a reporting period, such that the network element devices bearing the service flow send data according to the detection type and the reporting period; receiving the data sent from the network element devices; determining a path of the service flow according to the data; and detecting a network quality of the path according to the data and a predetermined indicator threshold.

In some embodiments, the subscription command further carries a service flow identity, the data includes at least the service flow identity and a time stamp, and after the data sent from the network element devices is received and before the path of the service flow is determined according to the data, the method further includes: labeling the data with a first label according to the service flow identity, wherein the data having the same service flow identity has the same first label; and determining the reporting period of the data according to the time stamp, and labeling the data with a second label according to the reporting period, wherein the data having the same reporting period has the same second label.

In some embodiments, the data further includes network element identity and port information, and after receiving the data sent from the network element devices and before determining the path of the service flow according to the data, the method further includes: dividing the data into network element data, link data and end-to-end data. The determining of the path of the service flow according to the data, includes: matching the network element data, the link data, and the end-to-end data hop by hop, from a starting network element device for determining the path, based on the network element identity and port information, and forming the path of the service flow based on a matching result; and sequentially labeling the data on the path with a third label according to a flow direction of the service flow.

In some embodiments, the starting network element device is the ingress network element device and/or the egress network element device of the service flow.

In some embodiments, after determining the path of the service flow according to the data, the method further includes: generating a network topology map of the service flow according to the path, and marking and displaying the path on the network topology map; and after detecting the network quality of the path according to the data and the predetermined indicator threshold, the method further includes: responsive to that a network fault is detected, displaying the fault on the path of the network topology map.

In another aspect, an embodiment of the disclosure further provides a network quality detection method, including: receiving a subscription command sent from a network quality detection device to obtain a detection type and a reporting period carried in the subscription command; responsive to that the detection type is a hop-by-hop detection, setting a value of a first identity to a first value and setting a value of a second identity to the reporting period in the service data message to be sent to the next-hop network element device; and sending the data to the network quality detection device according to the reporting period.

In some embodiments, the setting the value of the first identity to the first value and setting the value of the second identity to the reporting period in the service data message to be sent to the next-hop network element device, includes: setting the value of the first identity to the first value and setting the value of the second identity to the reporting period in the service data message to be sent to the next-hop network element device according to an interval duration.

In some embodiments, the service data message includes a service flow identity extension field, and the first identity and the second identity are configured in the service flow identity extension field.

In some embodiments, the network quality detection method further includes: responsive to that the detection type is an end-to-end detection, setting the value of the first identity to a second value and setting the value of the second identity to null in the service data message to be sent to the next-hop network element device; and sending the data to the network quality detection device according to the reporting period.

In some embodiments, the network quality detection method further includes: receiving the service data message sent from a previous hop network element device to obtain the first identity and the second identity in the service data message; responsive to that the value of the first identity is the first value, sending the data to the network detection device according to the value of the second identity, the value of the second identity being the reporting period; and setting the value of the first identity to the first value and setting the value of the second identity to the reporting period in the service data message to be sent to the next-hop network element device.

In some embodiments, the network quality detection method further includes: responsive to that the value of the first identity is the second value, setting the value of the first identity to the second value and setting the value of the second identity to null in the service data message to be sent to the next-hop network element device.

In another aspect, an embodiment of the disclosure further provides a network quality detection device, including: a sending module, a receiving module, a determination module, and a detection module, wherein the sending module is configured to send a subscription command for instructing to detect a service flow to the ingress network element device and the egress network element device of the service flow, respectively, wherein the subscription command carries at least a detection type and a reporting period, such that the network element device bearing the service flow sends data according to the detection type and the reporting period; the receiving module is configured to receive the data sent from the network element devices; the determination module is configured to determine, according to the data, a path of the service flow; and the detection module is configured to detect a network quality of the path according to the data and a predetermined indicator threshold.

In another aspect, an embodiment of the disclosure further provides a network element device, including: a receiving module, an obtaining module, a processing module and a sending module, wherein the receiving module is configured to receive a subscription command sent from a network quality detection device; the obtaining module is configured to obtain a detection type and a reporting period carried in the subscription command; the processing module is configured to, responsive to that the detection type is a hop-by-hop detection, set a value of a first identity to a first value and a value of a second identity to the reporting period in the service data message to be sent to the next-hop network element device; and the sending module is configured to send the data to the network quality detection device according to the reporting period.

In another aspect, an embodiment of the disclosure further provides a computer device, including: at least one processor; and a storage device having at least one program stored thereon, wherein when executed by the at least one processor, the at least one program causes the at least one processor to implement the network quality detection method as set forth in the preceding embodiments.

In another aspect, an embodiment of the disclosure further provides a computer readable medium having a computer program stored thereon, wherein the computer program, when executed, implements the network quality detection method as set forth in the preceding embodiments.

DETAIL DESCRIPTION OF EMBODIMENTS

Some embodiments will be described in detail below with reference to the accompanying drawings, but the embodiments can be embodied in different forms and should not be construed as being limited to the embodiments set forth herein. Instead, the embodiments are provided for the purpose of thorough and complete disclosure, and will enable those skilled in the art to fully understand the scope of the disclosure.

As used herein, the term "and/or" includes any and all combinations of one or more of the relevant enumerated entries.

The terms used herein are intended to describe particular embodiments only and are not intended to limit the present disclosure. As used herein, unless the context clearly indicates otherwise, the singular forms "a" and "the" are also intended to include the plural forms. It will also be understood that when the terms "comprise" and/or "consist of . . . " are used in this specification, it means the presence of the feature, whole, step, operation, component and/or assembly as set forth and does not exclude the presence or addition of one or more other features, wholes, steps, operations, components, assemblies, and/or groups thereof.

The embodiments herein will be described in the way of ideal schematics with reference to plan and/or cross-sectional drawings in the present disclosure. Accordingly, exemplary illustrations can be modified according to manufacturing techniques and/or tolerances. Thus, the embodiments are not limited to those shown in the accompanying drawings, but include modifications of configurations based on manufacturing processes. Accordingly, zones exemplified in the accompanying drawings have schematic properties, and shapes of the zones as shown exemplify specific shapes of zones of components, but are not intended to be limited thereto.

Unless otherwise limited, all terms used herein (including technical and scientific terms) have the same meaning as commonly understood by those having ordinary skill in the art. It will also be understood that terms such as those defined in commonly used dictionaries should be construed to have a meaning consistent with their meaning in the relevant art and in the context of the present disclosure, and will not be construed to have an idealized or overly formal meaning unless expressly so defined herein.

An embodiment of the present disclosure provides a network quality detection method. The method can be applied to, but not limited to, the detection of 5G network quality. The method is applied in a system including a network quality detection device (e.g., a control server), a data collection server, and a number of network element devices for carrying service flows. In an initialization phase, the following operations are performed: 1. configuring generic detection parameters, wherein the generic detection parameters include compression format, reporting channel and reporting protocol, for example, the compression format including GPB and GPB-KV, etc., the reporting channel including DCN (Data Communication Network) channel, and the reporting protocol including UDP (User Datagram Protocol) and gRPC (Remote Procedure Call) protocol; 2. selecting a detection object (i.e., a service flow to be detected) and configuring detection task parameters, wherein the detection task parameters include tunnel parameters, detection types and command parameters related to the detection tasks such as subscription, coloring, encapsulation, and decapsulation commands. Taking an IP service flow of L3VPN (Virtual Private Network) as an example, the detection task parameters thereof can include a service flow identity, a detection type, a source network element, a service access point, a source IP (which supports both IPV4/IPV6), a source port, a protocol number, a host IP, a host port, a DSCP (Differentiated Services Code Point) priority, a delay priority, and reporting period.

Figure 1:
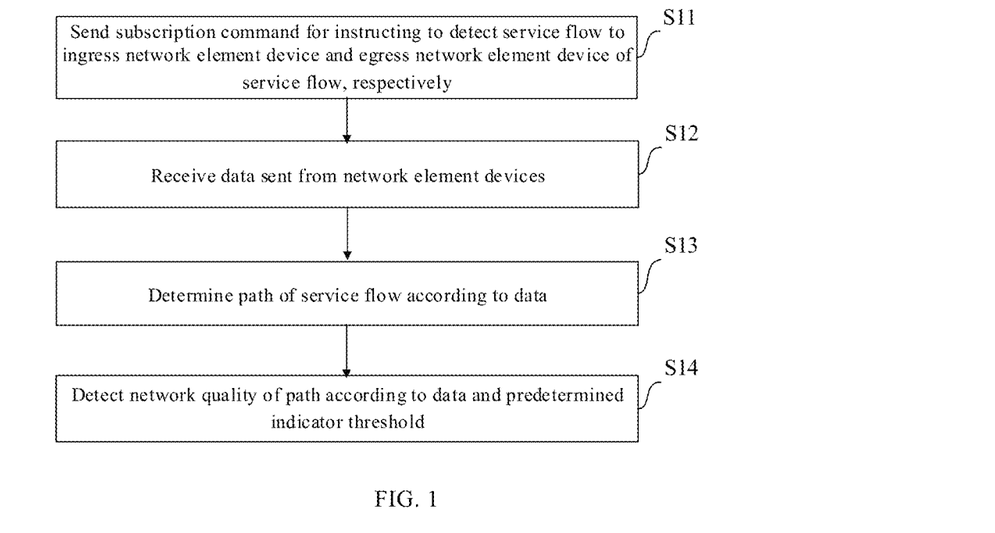
FIG. 1 is a flowchart of a network quality detection method according to an embodiment of the present disclosure.

With reference to FIG. 1, the network quality detection method according to the embodiment will be described in detail. As shown in FIG. 1, the method includes the following steps.

Step 11, a subscription command for instructing to detect a service flow is sent to an ingress network element device and an egress network element device of the service flow, respectively.

The subscription command carries at least a detection type and a reporting period. In this step, a network quality detection device sends the subscription command to the ingress network element device and the egress network element device of the service flow, respectively, such that the network element devices bearing the service flow send data according to the detection type and the reporting period. Specifically, the network element device that receives the subscription command, i.e., the ingress network element device and the egress network element device (usually, a PE device) of the service flow, obtains the detection type and the reporting period from the subscription command, and determines whether to send the reporting period to the next hop network element device according to the detection type. It is noted that the subscription command also carries generic detection parameters and other parameters for detection task.

In some embodiments, the network quality detection device sends a subscription command to the data collection server, which sends the subscription command to the ingress network element device and the egress network element device of the service flow, respectively.

Step 12, the data sent from the network element devices is received.

The data sent from the network element device is performance data of the device and link, which can include packet loss number, packet loss rate, delay, jitter, for example. The network element device can use Telemetry protocol to report the performance data of this device (i.e., single-point performance data) to the data collection server in real time, and the data collection server reports the performance data reported by each network element device to the network quality detection device. The network quality detection device parses the data according to the encoding and compression format to obtain required information (including FlowID, timestamp, and count information, for example). It should be noted that in order to ensure the correctness of data parsing, it is necessary to ensure the time synchronization of the network element devices and the completeness of the data reported from the network element devices.

Step 13, a path of the service flow is determined according to the data.

Since the data sent from the network element device is real-time data and the service flow has a unique path at the same moment, the unique path of the service flow at a certain moment can be determined based on the data. The specific implementation of determining the path of the service flow based on the data will be subsequently described in detail in conjunction with FIG. 3.

Step 14, a network quality of the path is detected according to the data and a predetermined indicator threshold.

The indicator thresholds can be set on a service flow basis, i.e., a series of associated performance indicator thresholds are set for each service flow. The thresholds may also be set based on service types, i.e., a series of associated performance indicator thresholds are set for each service type.

In this step, the network quality detection device compares the data reported from the network element devices on the path of the service flow with the corresponding indicator thresholds, and if the data meets a corresponding performance indicator condition, the performance indicator is considered qualified; if the data does not meet the corresponding performance indicator condition, the node or link is considered faulty.

As can be seen from Steps 11 to 14, in this embodiment of the disclosure, the subscription command is sent to the ingress network element device and the egress network element device of the service flow, respectively, and the subscription command includes at least the detection type and the reporting period to cause the network element devices carrying the service flow to send the data according to the detection type and the reporting period; the data sent from the network element devices is received; the path of the service flow is determined according to the data; and the network quality of the path is detected based on the data and the predetermined indicator threshold. According to the embodiment of the disclosure, the subscriptions are issued only to the first and last network element devices of the service flow, rather than to the uncertain network element devices. Therefore, it is possible to well optimize the pre-processing process of in-band detection, reduce resource consumption, shorten the processing procedure, and improve the resource utilization of the In-band OAM of the network element devices. The method according to this embodiment has a significant advantage especially in the scenario of 100,000 orders of detection tasks. The embodiment of the disclosure only needs to issue subscriptions to the first and last network element devices of the service flow, and the real path of the service flow can be obtained by the path reduction based on the data reported by the network element devices without knowing the information of the P devices involved in the service flow in advance, thereby solving the problem that the eX2 east-west service flow having no tunnel entities cannot be detected and the problem that the performance data are mismatched due to the path reversal.

Figure 2:
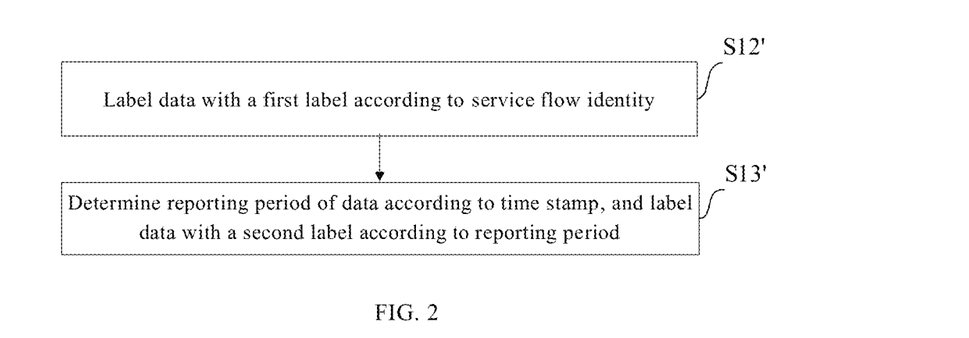
FIG. 2 is a flowchart of data pre-processing according to an embodiment of the present disclosure.

In another embodiment of the disclosure, after the receipt of the data sent from the network element devices (i.e., Step 12) and before the determination of the path of the service flow based on the data (i.e., Step 13), the received data can also be pre-processed. The subscription command can also carry a service flow identity (FlowID), and the data includes at least the service flow identity and a time stamp. As shown in FIG. 2, the data pre-processing procedure can include the following steps.

Step 12', the data is labeled with a first label according to a service flow identity.

In this step, the network quality detection device labels the data having the same service flow identity with the same first label. The first label can be a service flow identity. The service flow identity is uniformly assigned by the network quality detection device to ensure global uniqueness in the detection domain.

Step 13', the reporting period of the data is determined according to the time stamp, and the data is labeled with a second label according to the reporting period.

In this step, the network quality detection device labels each data having the same reporting period with the same second label. The second label can be a block number of the reporting period (Blocknum).

Further, the data pre-processing procedure can also include a step of dividing the data into network element data, link data, and end-to-end data. It should be noted that this step is performed in any order with Step 12' and Step 13', and can also be performed simultaneously.

Figure 3:
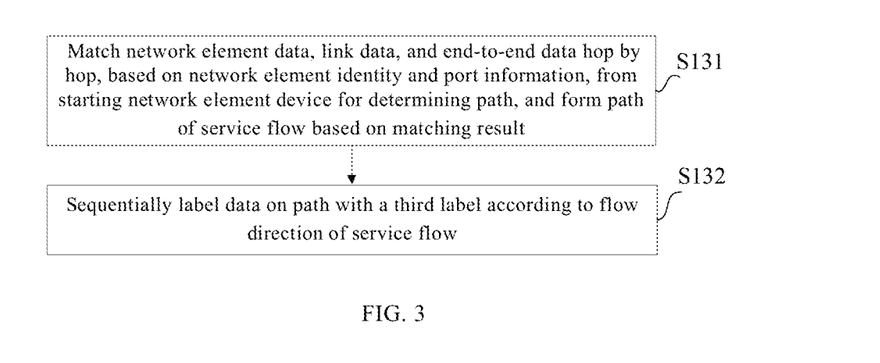
FIG. 3 is a flowchart of determining a path for a service flow according to an embodiment of the present disclosure.

In some embodiments of the disclosure, as shown in FIG. 3, the determination of the path of the service flow based on the data (i.e., Step 13), includes the following steps.

Step 131, from a starting network element device for determining the path, the network element data, the link data, and the end-to-end data are matched hop by hop based on the network element identity and port information, and the path of the service flow is formed based on a matching result.

In this step, the network quality detection device can employ a directed graph topology search algorithm to match the network element data, the link data and the end-to-end data hop by hop from the starting network element device based on the network element identity and port information to form the path of the service flow. The starting network element device can be specified in advance. The directed graph topology search algorithm is started from the starting network element device to match data forward or backward, hop by hop, respectively.

Since it is not guaranteed that the reported data is completely order preserving, any data can be used as the starting network element device in order to improve the real-time processing. However, to improve the efficiency of path reduction, the ingress network element device and/or the egress network element device of the service flow can be used as the starting network element device.

Step 132, the data on the path is sequentially labeled with a third label according to a flow direction of the service flow.

In this step, the network quality detection device labels the data on the path with the third label according to the flow direction of the service flow. The data includes network element data, link data, and end-to-end data. In other words, the network quality detection device starts from the ingress network element device of the service flow, and incrementally labels each link data and each network element device data on the path with the third label according to the flow direction of the service flow until the labeling reaches the egress network element device of the service flow. At this point, the labeling of the third label is completed in the background, i.e., the background processing of the service path reduction is completed. It should be noted that for the ECMP scenario where there are multiple paths for the service flow, the third label needs to be labeled for each of the paths separately.

Figure 4:
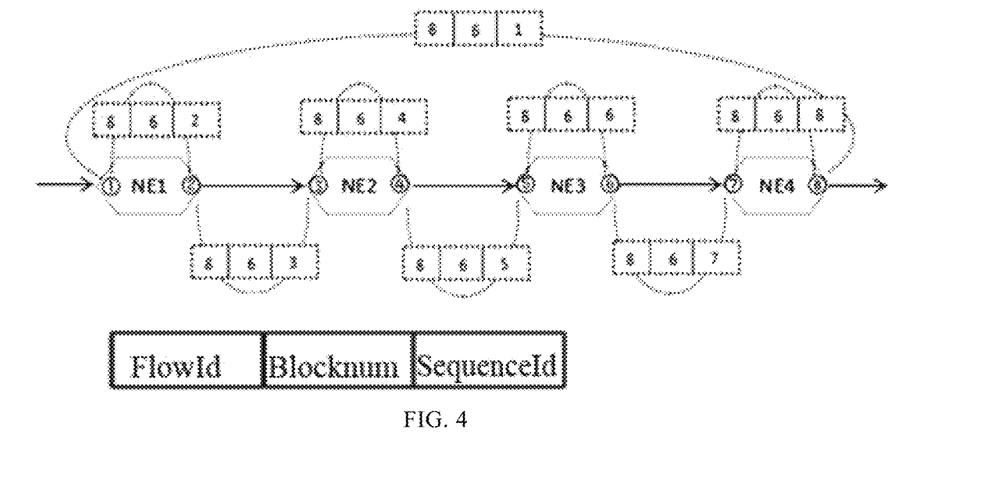
FIG. 4 is an example of data processing according to an embodiment of the present disclosure.

As shown in FIG. 4, each data includes the first label, the second label and the third label, in which the first label is the service flow identity (FlowID), the second label is the block number of the reporting period (Blocknum), and the third label is the sequence identity of the service flow (SequenceID). The first node NE1 and the fourth node NE4 are PE devices, and the second node NE2 and the third node NE3 are P devices. The ingress device of the service flow is the first node NE1, the ingress port is port 1, the egress device of the service flow is the fourth node NE4, and the egress port is port 8. The path of the service flow having the service flow identity of 8 is shown by arrows in FIG. 4, i.e., NE1→NE2→NE3→NE4.

Compared with the conventional in-band detection path reduction algorithm, the in-band detection path reduction process according to the embodiment of the disclosure does not need to rely on a static routing database since there is no need to parse the routing information of the intermediate P device and there is no route to rely on.

It should be noted that after the path reduction of the service flow is completed, the relevant data also needs to be stored in the database.

Figure 5:
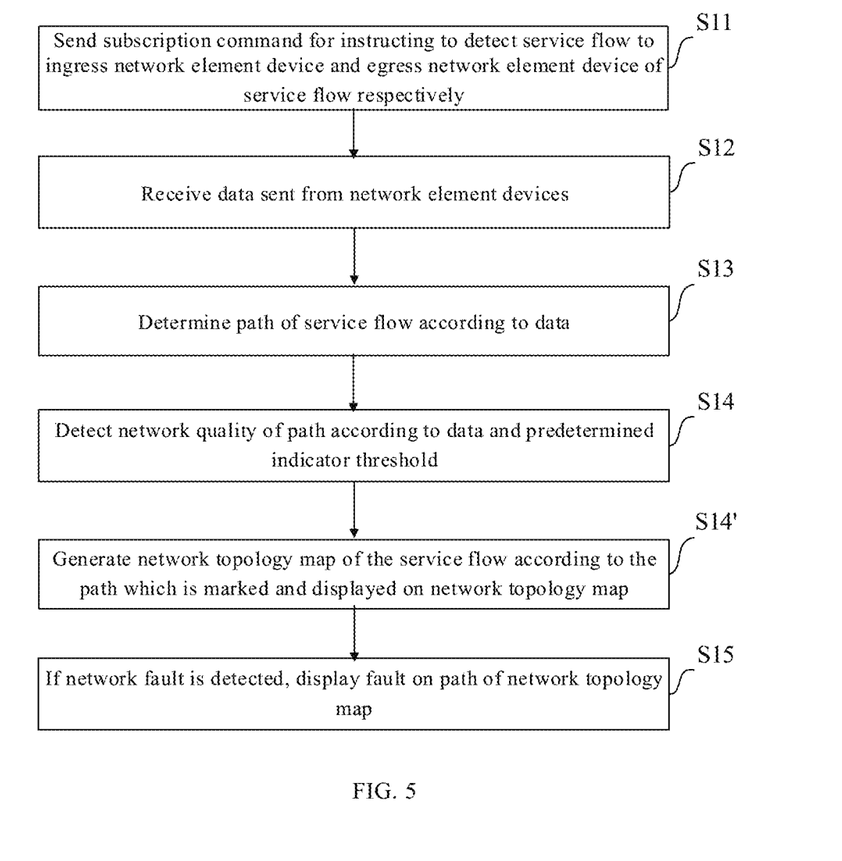
FIG. 5 is a flowchart of a network quality detection method according to another embodiment of the present disclosure.

Further, in order to achieve an intuitive determination of faults, in some embodiments, as shown in FIG. 5, after determining the path of the service flow based on the data (i.e., Step 13), the network quality detection method can further include the following steps.

Step 14', a network topology map of the service flow is generated according to the path, and the path is marked and displayed on the network topology map.

Figure 6:
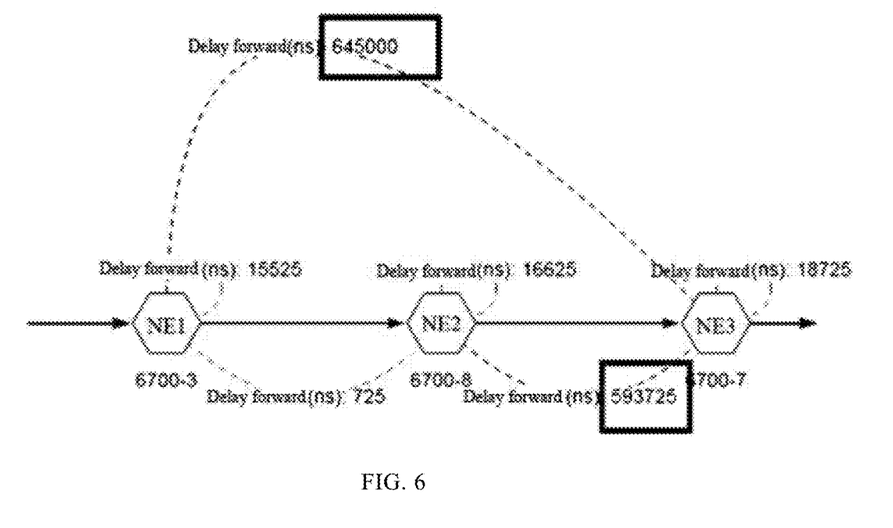
FIG. 6 is a schematic diagram showing paths and faults of service flows according to an embodiment of the present disclosure.

In this step, the network quality detection device generates a network topology map in relation to the path of the service flow. Taking the path of the service flow NE1→NE2→NE3 as an example, as shown in FIG. 6, the network topology map can be presented to the user. FIG. 6 illustrates a display interface of the network topology map produced by means of software simulation, wherein the path of the service flow can be indicated by a solid arrow.

It should be noted that Step 14' and Step 14 can be executed in any order, or can be executed simultaneously. In this embodiment, Step 14' is executed after Step 14 as an example.

Further, as shown in FIG. 5, after detecting the network quality of the path (i.e., Step 14) based on the data and the predetermined indicator threshold, the method further includes:

Step 15, if a network fault is detected, the fault is displayed on the path of the network topology map.

The performance data at a certain moment can be selected to show the path of the service flow at that moment in the form of a directed topology diagram, as well as the performance data indicators of segments of the links in the path. The data that cross a limit can be shown in red according to the pre-configured indicator thresholds. As such, the faults can be delimited quickly, efficiently and intuitively. As shown in FIG. 6, a schematic link of the end-to-end (NE1 node to NE3 node) delay performance data appears in red, indicating that the end-to-end delay indicator have crossed the limit. The topology map shows that the schematic link of the delay data of the link between the tail node NE3 and the previous node NE2 is also red, while the other nodes and links have normal colors. As such, it is possible to quickly and intuitively determine that an excessive delay between a port of the node NE2 previous to the tail node NE3 and a port of the tail node NE3 causes an excessive delay indicator of the whole service flow.

By selecting real-time performance data, the embodiment of the disclosure is able to visually present the path of the service at a certain moment in the form of a network topology, present node failures and link failures, present the performance data indicators of each service flow from the ingress port to the egress port, and identify the transgressed data and the link where it is located when there is performance data transgressed. In such a manner, the fault delimitation can be completed quickly and intuitively. Moreover, by continuously observing and comparing, it is easy and intuitive to discover whether the service path has changed, and thus determine whether a primary-secondary reversal of the service path has occurred.

Further, in some embodiments of the disclosure, after Step 12, the network quality detection method can further include presenting the data in various forms. Specifically, the data presentation forms can include the following.

1. Real-time graphical presentation. The network quality detection device receives the data reported from the network element devices, refreshes the data in the form of a table, and presents the data that crosses the limit in red according to the pre-configured indicator threshold.

2. Real-time trend graph presentation. The network quality detection device selects the network element data, link data and end-to-end data at a moment, and presents a trend of real-time data changes in the form of associated graphs, such that the data that have crossed the limit can be shown in red according to the pre-configured indicator thresholds in red to show, and the peak, valley and threshold line can also be shown.

3. Historical trend graph presentation. The network quality detection device selects the network element data, link data and end-to-end data at a moment, and presents a trend of data changes in a specified period of time in the form of associated graphs, such that the data that have crossed the limit can be shown in red according to the pre-configured indicator thresholds in red to show, and the peak, valley and indicator threshold line can also be shown.

When a network failure is detected, in order to make further analysis, the historical trend graph of the relevant data can be further reviewed. As such, it can be determined whether the data continuously crosses the threshold during the historical period of time or suddenly crosses the indicator threshold at that moment.

Figure 7:
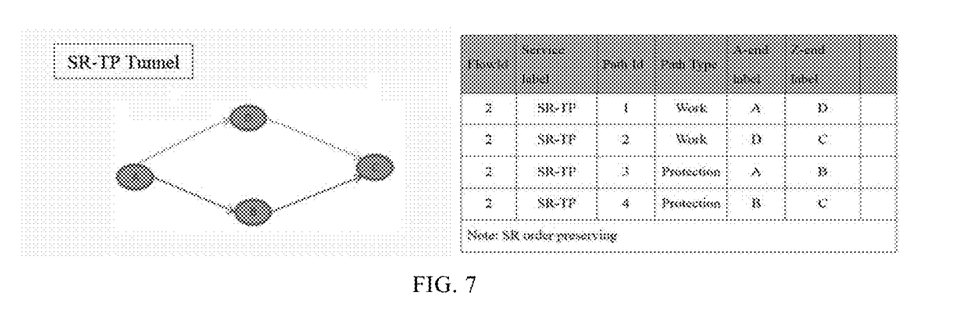
FIG. 7 is an example of an ECMP scenario according to an embodiment of the present disclosure.

The embodiment of the disclosure can be applied in an ECMP scenario. As shown in FIG. 7, there are two paths for service flow from device A to device C through the SR-TP tunnel, i.e., the path A-D-C and the path A-B-C, with path A-D-C being the current working path and path A-B-C being the protected path. With the network quality detection method according to this embodiment of the disclosure, the network quality detection device only sends subscription commands to the first and last PE devices (i.e., device A and device C), and in the hop-by-hop detection mode, device A sends service data messages carrying the first identity and the second identity to device B and device D, respectively, so that device B and device D can report data to the network quality detection device based on the value of the second identity. In contrast, according to the conventional network quality detection method, the network quality detection device needs to send subscription commands to devices A, B, C, and D, respectively. Therefore, the embodiment of the present disclosure can reduce the resource consumption of device B and device D, improve the utilization of In-band OAM resources, and optimize the pre-processing procedures of in-band detection, and will not affect the network quality detection results even if path reversal occurs, thereby providing an effective solution for network quality detection in ECMP scenarios.

Figure 8:
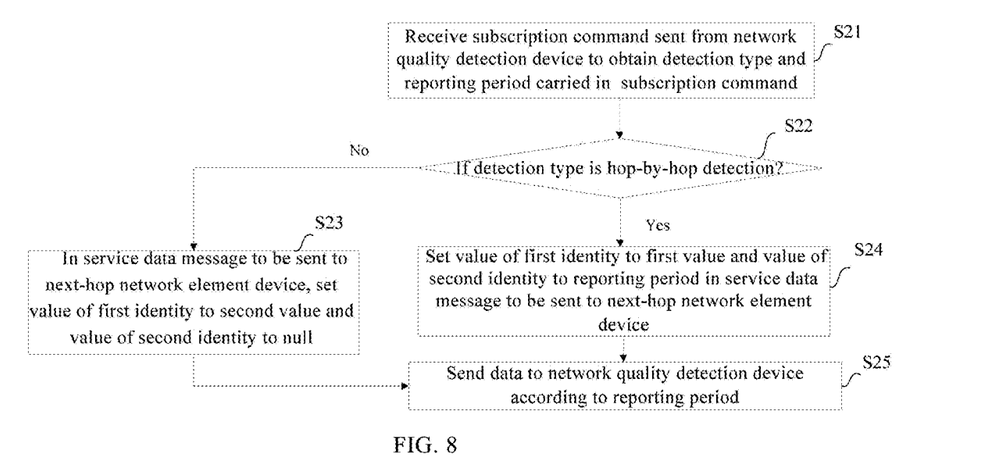
FIG. 8 is a flowchart of a network quality detection method implemented by a PE device according to an embodiment of the present disclosure.

Another embodiment of the disclosure also provides a network quality detection method, wherein the executive subject of the method is a network element device for bearing a service flow, and the network element device includes a PE device and a P device. When the network element device is the PE device, as shown in FIG. 8, the method includes the following steps.

Step 21, a subscription command sent from a network quality detection device is received to obtain a detection type and a reporting period carried in the subscription command.

The subscription command is sent from the network quality detection device to the ingress network element device and the egress network element device of the service flow. The ingress network element device and the egress network element device of the service flow parse the received subscription command to obtain the detection type and the reporting period carried therein.

Step 22, the detection type is judged, and if the detection type is a hop-by-hop detection, Step 24 is executed; if the detection type is an end-to-end detection, Step 23 is executed.

If the ingress and egress network element devices of the service flow determine that the detection type is the hop-by-hop detection, a value of the first identity is set to a first value and a value of the second identity is set to the reporting period in the service data message to be sent to the next-hop network element device (i.e., Step 24 is executed). In other words, in the hop-by-hop detection mode, the ingress network element device of the service flow sends the reporting period to the next-hop network element so that the next-hop element device reports the data to the network quality detection device according to the reporting period. It should be noted that for the egress network element device of the service flow, the service data messages will no longer be sent because there is no next-hop network element device.

If the ingress and egress network element devices of the service flow determine that the detection type is the end-to-end detection, a value of the first identity is set to a second value and a value of the second identity is set to null in the service data message to be sent to the next-hop network element device (i.e., Step 23 is executed). In other words, in the end-to-end detection mode, the ingress network element device of the service flow does not send the reporting period to the next-hop network element device (but service data messages can be normally sent). Accordingly, the next-hop element device will not report data to the network quality detection device. It should be noted that for the egress network element device of the service flow, the service data messages will no longer be sent because there is no next-hop network element device.

Step 23, in the service data message to be sent to the next-hop network element device, the value of the first identity is set to the second value and the value of the second identity is set to null.

In some embodiments, the service data message includes a service flow identity extension field, and the first identity H and the second identity T can be configured in the service flow identity extension field. In this step, for the ingress network element device of the service flow, the value of the first identity H is set to the second value and the value of the second identity T is set to null in the service flow identity (FlowID) extension field of the outer encapsulation packet of the service data message. It is noted that the value of the first identity H can be the first value or the second value; the first value can be 1 and the second value can be 0. When the value of the first identity H is the first value, it means to instruct the next-hop network element device to report data to the network quality detection device; when the value of the first identity H is the second value, it means to instruct the next-hop network element device not to report data to the network quality detection device.

To further reduce the resource occupation of the network element device, in some embodiments, the value of the first identity can be set to the first value and the value of the second identity can be set to the reporting period in the service data message to be sent to the next-hop network element device according to an interval duration. In other words, instead of carrying the first identity and the second identity in each service data message to be sent to the next-hop network element device, the value of the first identity and the value of the second identity are sent to the next-hop network element device at intervals. The interval duration can be continuously self-learned and optimized by the network element device through training of actual service flows.

It should be noted that the network element device that receives the subscription command not only needs to send service data messages to its next-hop network element device, but also needs to report data to the network quality detection device according to the reporting period (i.e., Step 25 is executed).

Step 24, the value of the first identity is set to the first value and the value of the second identity is set to the reporting period in the service data message to be sent to the next-hop network element device.

In this step, for the ingress network element device of the service flow, the value of the first identity H is set to a first value (e.g., 1) and the value of the second identity T is set to the reporting period in the service flow identity (FlowID) extension of the outer encapsulation packet of the service data message.

To further reduce the resource occupation of the network element device, in some embodiments, the value of the first identity can be set to the first value and the value of the second identity can be set to the reporting period in the service data message to be sent to the next-hop network element device according to an interval duration. In other words, instead of carrying the first identity and the second identity in each service data message to be sent to the next-hop network element device, the value of the first identity and the value of the second identity are sent to the next-hop network element device at intervals. The interval duration can be continuously self-learned and optimized by the network element device through training of actual service flows.

Step 25, the data is sent to the network quality detection device according to the reporting period.

In this step, both the ingress network element device and the egress network element device of the service flow send the data of the local device to the network quality detection device according to the reporting period.

It is noted that Steps 24 and 25 can be performed in any order, and Steps 23 and 25 can be performed in any order.

Figure 9:
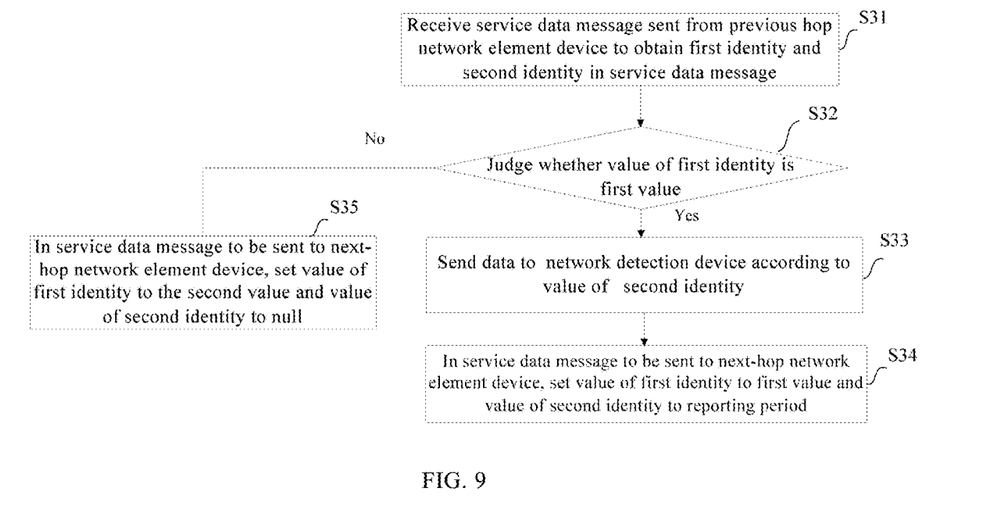
FIG. 9 is a flowchart of a network quality detection method implemented by a P device according to an embodiment of the present disclosure.

Another embodiment of the disclosure also provides a network quality detection method, wherein the executive subject of the method is a network element device for bearing a service flow, and the network element device includes a PE device and a P device. When the network element device is the P device, as shown in FIG. 9, the method includes the following steps.

Step 31, the service data message sent from the previous hop network element device is received to obtain the first identity and the second identity in the service data message.

Step 32, whether the value of the first identity is the first value is judged, and if yes, Step 33 and Step 34 are executed; otherwise, Step 35 is executed.

If the network element device (P device) determines that the value of the first identity is the first value (e.g., 1), it is indicated that the detection mode of the service flow is a hop-by-hop detection. The network element device needs to report its own performance data. Then, the network element device reports data to the network quality detection device according to the value of the second identity (i.e., the reporting period), and in the service data message to be sent to the next-hop network element device, sets the value of the first identity to the first value and the value of the second identity to the reporting period (i.e., Steps 33 and 34 are executed).

If the network element device (P device) determines that the value of the first identity is the second value (e.g., 0), it is indicated that the detection mode of the service flow is an end-to-end detection. The network element device does not need to report its own performance data. Then, the network element device sets the value of the first identity to the second value and the value of the second identity to null in the service data message to be sent to the next-hop network element device (i.e., Step 35 is executed).

Step 33, the data is sent to the network detection device according to the value of the second identity.

The value of the second identity is the reporting period.

Step 34, in the service data message to be sent to the next-hop network element device, the value of the first identity is set to the first value and the value of the second identity is set to the reporting period.

Step 35, in the service data message to be sent to the next-hop network element device, the value of the first identity is set to the second value and the value of the second identity is set to null.

To further reduce the resource occupation of the network element device, in some embodiments, in Step 34 and/or Step 35, first identity information and second identity information can be carried in the service data message to be sent to the next-hop network element device in accordance with the interval duration. The interval duration can be continuously self-learned and optimized by the network element device through training of the actual service flow.

It is noted that Steps 33 and 34 can be executed in any order.

In some embodiments, the P device detects the first identity H in the outer encapsulation packet of the service data message according to a certain interval duration, and if the value of the first identity H is 0, the value of the second identity T will be set to null and the P device will not count and report the performance indicator. If the value of the first identity H is 1, the performance data counting and the performance data reporting will be initiated, i.e., the data is reported in accordance with the value of the second identity T (i.e., the reporting period).

Figure 10:
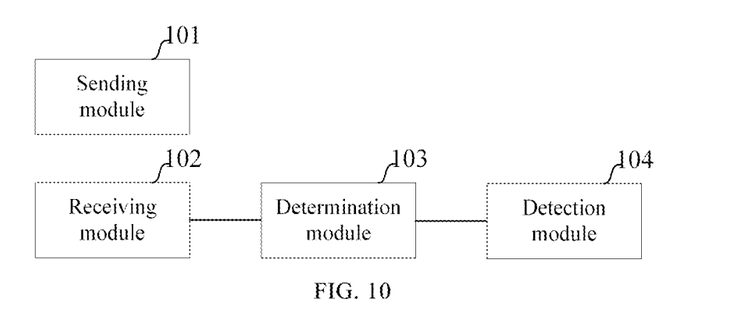
FIG. 10 is a block diagram of a structure of a network quality detection device according to another embodiment of the present disclosure.

Based on the same technical concept, an embodiment of the disclosure also provides a network quality detection device. As shown in FIG. 10, the network quality detection device includes: a sending module 101, a receiving module 102, a determination module 103 and a detection module 104.

The sending module 101 is configured to send a subscription command for instructing to detect a service flow to the ingress network element device and the egress network element device of the service flow, respectively, wherein the subscription command carries at least a detection type and a reporting period, such that the network element device bearing the service flow sends data according to the detection type and the reporting period.

The receiving module 102 is configured to receive the data sent from the network element devices.

The determination module 103 is configured to determine, according to the data, a path of the service flow.

The detection module 104 is configured to detect a network quality of the path according to the data and a predetermined indicator threshold.

In some embodiments, the subscription command also carries a service flow identity, and the determination module 103 is further configured to, before detecting the network quality of the path according to the data and the predetermined indicator threshold, label the data with a first label according to a service flow identity, wherein the first label is the same for the data having the same service flow identity; and to determine the reporting period of the data according to a time stamp and label the data with a second label according to the reporting period, wherein the second label is the same for the data having the same reporting period.

In some embodiments, the data further includes network element identity and port information, and the determination module 103 is further configured to, before detecting the network quality of the path according to the data and the predetermined indicator threshold, classify the data into network element data, link data and end-to-end data.

The determination module 103 is specifically configured to match the network element data, the link data and the end-to-end data hop by hop, from the starting network element device arranged to determine the path, based on the network element identity and port information, and to form the path of the service flow based on a matching result; and to label the data on the path with a third label sequentially according to a flow direction of the service flow.

In some embodiments, the starting network element device is an ingress network element device and/or an egress network element device for the service flow.

In some embodiments, the network quality detection device further includes a display module, configured to generate, based on the path, a network topology map of the service flow and to mark and display the path on the network topology map; and, when a network fault is detected, to display the fault on the path of the network topology map.

Figure 11:
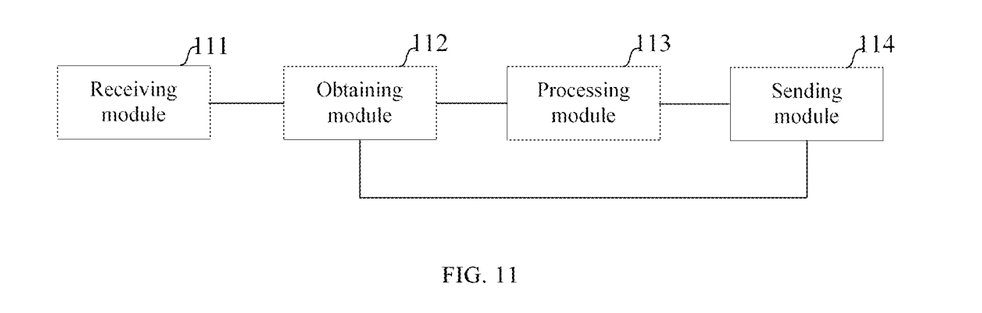
FIG. 11 is a block diagram of a structure of a network element device according to yet another embodiment of the present disclosure.

Based on the same technical concept, an embodiment of the disclosure also provides a network element device. As shown in FIG. 11, the network element device includes: a receiving module 111, an obtaining module 112, a processing module 113, and a sending module 114.

The receiving module 111 is configured to receive a subscription command sent from a network quality detection device.

The obtaining module 112 is configured to obtain a detection type and a reporting period carried in the subscription command.

The processing module 113 is configured to, responsive to that the detection type is a hop-by-hop detection, set a value of a first identity to a first value and a value of a second identity to the reporting period in the service data message to be sent to the next-hop network element device.

The sending module 114 is configured to send the data to the network quality detection device according to the reporting period.

In some embodiments, the processing module 113 is configured to set the value of the first identity to the first value and set the value of the second identity to the reporting period in the service data message to be sent to the next hop network element device, according to an interval duration.

In some embodiments, the service data message includes a service flow identity extension field, and the first identity and the second identity are set in the service flow identity extension field.

In some embodiments, the processing module 113 is further configured to set the value of the first identity to a second value and set the value of the second identity to null in the service data message to be sent to the next hop network element device in response to an end-to-end detection being the detection type.

In some embodiments, the receiving module 111 is further configured to receive the service data message sent from the previous-hop network element device.

The obtaining module 112 is further configured to obtain the first identity and the second identity in the service data message.

The processing module 113 is further configured to send the data to the network quality detection device according to a value of the second identity in response to a first value being the value of the first identity, the value of the second identity being the reporting period; and to set the value of the first identity to the first value and set the value of the second identity to the reporting period in the service data message to be sent to the next-hop network element device.

In some embodiments, the processing module 113 is further configured to set the value of the first identity to a second value and set the value of the second identity to null in the service data message to be sent to the next hop network element device, in response to the second value being the value of the first identity.

Figure 12:
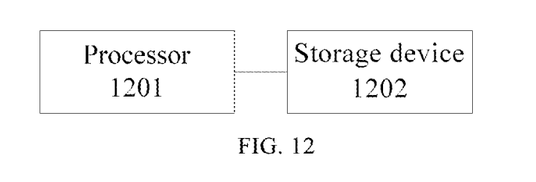
FIG. 12 is a block diagram of a computer device according to an embodiment of the present disclosure.

Referring to FIG. 12, an embodiment of the disclosure further provides a computer device, including: at least one processor 1201 and a storage device 1202, wherein the storage device 1202 stores at least one program thereon, and when executed by the at least one processor 1201, the at least one program causes the at least one processor to implement the network quality detection method according to the preceding embodiments.

An embodiment of the disclosure also provides a computer readable medium having a computer program stored thereon, wherein the computer program, when executed, implements the network quality detection method according to the preceding embodiments.

According to the embodiments of the disclosure, the subscription command is sent to the ingress network element device and the egress network element device of the service flow, respectively, and the subscription command includes at least the detection type and the reporting period to cause the network element devices carrying the service flow to send the data according to the detection type and the reporting period; the data sent from the network element devices is received; the path of the service flow is determined according to the data; and the network quality of the path is detected based on the data and the predetermined indicator threshold. According to the embodiments of the disclosure, the subscriptions are issued only to the first and last network element devices of the service flow, rather than to the uncertain network element devices. Therefore, it is possible to well optimize the pre-processing process of in-band detection, reduce resource consumption, shorten the processing procedure, and improve the resource utilization of the In-band OAM of the network element devices. The embodiments have a significant advantage especially in the scenario of 100,000 orders of detection tasks. The embodiments of the disclosure only need to issue subscriptions to the first and last network element devices of the service flow, and the real path of the service flow can be obtained by the path reduction based on the data reported by the network element devices without knowing the information of the P devices involved in the service flow in advance, thereby solving the problem that the eX2 east-west service flow having no tunnel entities cannot be detected and the problem that the performance data are mismatched due to the path reversal.

It should be understood by those having ordinary skill in the art that all or some of the steps, functional modules/units in the disclosed method as set forth above can be implemented as software, firmware, hardware, and any appropriate combinations thereof. In the hardware implementation, the division between functional modules/units mentioned in the above description does not necessarily correspond to the division of physical components; for example, a physical component can have multiple functions, or a function or step can be performed cooperatively by several physical components. Some or all of the physical components can be implemented as software executed by a processor, such as a central processing unit, a digital signal processor, or a microprocessor, or be implemented as hardware, or be implemented as an integrated circuit, such as a specialized integrated circuit. Such software can be distributed on a computer-readable medium, which can include computer storage media (or non-transitory media) and communication media (or transitory media). As is well known to those having ordinary skill in the art, the term "the computer storage medium" includes volatile and non-volatile, removable and non-removable media implemented in any method or technology for storing information, such as computer readable instructions, data structures, program modules, or other data. Computer storage media include, but are not limited to, RAM, ROM, EEPROM, flash memory or other memory technology, CD-ROM, digital versatile disk (DVD) or other optical disk storage, magnetic cartridges, magnetic tapes, disk storage or other magnetic storage devices, or any other media that can be used to store desired information and can be accessed by a computer. In addition, it is well known to those having ordinary skill in the art that communication media typically contain computer readable instructions, data structures, program modules, or other data in modulated data signals such as carrier waves or other transmission mechanisms, and may include any information delivery medium.

A number of embodiments have been disclosed herein, and while specific terms are employed, they are intended to and should be construed only in a general illustrative sense and are not intended to be limiting. In some examples, it will be apparent to those skilled in the art that features, characteristics and/or elements described in combination with particular embodiments may be used alone, or may be used in combination with features, characteristics and/or elements described in combination with other embodiments, unless otherwise expressly noted. Thus, it will be understood by those skilled in the art that various changes in form and detail can be made without departing from the scope of the present disclosure as set forth by the appended claims.

What is claimed is:

1. A network quality detection method, comprising: sending a subscription command for instructing to detect a service flow to an ingress network element device and an egress network element device of the service flow, respectively, the subscription command carrying at least a detection type and a reporting period, such that the network element devices bearing the service flow send data according to the detection type and the reporting period; receiving the data sent from the network element devices; determining a path of the service flow according to the data; and detecting a network quality of the path according to the data and a predetermined indicator threshold; wherein the subscription command further carries a service flow identity, the data includes at least the service flow identity and a time stamp, and after receiving the data sent from the network element devices and before determining the path of the service flow according to the data, the method further comprises: labeling the data with a first label according to the service flow identity, wherein the data having the same service flow identity has the same first label; and determining the reporting period of the data according to the time stamp, and labeling the data with a second label according to the reporting period, wherein the data having the same reporting period has the same second label.

2. The method according to claim 1, wherein the data further comprises network element identity and port information, and wherein after receiving the data sent from the network element devices and before determining the path of the service flow according to the data, the method further comprises: dividing the data into network element data, link data and end-to-end data, and the determining the path of the service flow according to the data, comprises:

matching the network element data, the link data, and the end-to-end data hop by hop, from a starting network element device for determining the path, based on the network element identity and port information, and forming the path of the service flow based on a matching result; and sequentially labeling the data on the path with a third label according to a flow direction of the service flow.

3. The method according to claim 2, wherein the starting network element device comprises at least one of: the ingress network element device or the egress network element device of the service flow.

4. The method according to claim 1, wherein after determining the path of the service flow according to the data, the method further comprises: generating a network topology map of the service flow according to the path, and marking and displaying the path on the network topology map; and after detecting the network quality of the path according to the data and the predetermined indicator threshold, the method further comprises: responsive to that a network fault is detected, displaying the fault on the path of the network topology map.

5. A network quality detection device, comprising: a processor configured to, when operated, carry out the network quality detection method according to claim 1.

6. A computer device comprising,
at least one processor; and
a storage device having at least one program stored thereon, wherein
when executed by the at least one processor, the at least one program causes the at least one processor to implement the network quality detection method according to claim 1.

7. A non-transitory computer readable medium having a computer program stored thereon, wherein the computer program, when executed, implements the network quality detection method according to claim 1.

8. A network quality detection method, comprising:
receiving a subscription command sent from a network quality detection device to obtain a detection type and a reporting period carried in the subscription command;
responsive to that the detection type is a hop-by-hop detection, setting a value of a first identity to a first value and setting a value of a second identity to the reporting period in the service data message to be sent to the next-hop network element device; and
sending the data to the network quality detection device according to the reporting period.

9. The network quality detection method according to claim 8, wherein the setting the value of the first identity to the first value and setting the value of the second identity to the reporting period in the service data message to be sent to the next-hop network element device, comprises:

setting the value of the first identity to the first value and setting the value of the second identity to the reporting period in the service data message to be sent to the next-hop network element device according to an interval duration.

10. The network quality detection method according to claim 8, wherein the service data message includes a service flow identity extension field, and the first identity and the second identity are configured in the service flow identity extension field.

11. The network quality detection method according to claim 8, further comprising:

responsive to that the detection type is an end-to-end detection, setting the value of the first identity to a second value and setting the value of the second identity to null in the service data message to be sent to the next-hop network element device; and sending the data to the network quality detection device according to the reporting period.

12. The network quality detection method according to claim 11, further comprising:

receiving the service data message sent from a previous hop network element device to obtain the first identity and the second identity in the service data message;

responsive to that the value of the first identity is the first value, sending the data to the network detection device according to the value of the second identity, the value of the second identity being the reporting period; and setting the value of the first identity to the first value and setting the value of the second identity to the reporting period in the service data message to be sent to the next-hop network element device.

13. The network quality detection method according to claim 12, further comprising:

responsive to that the value of the first identity is the second value, setting the value of the first identity to the second value and setting the value of the second identity to null in the service data message to be sent to the next-hop network element device.

14. A network element device comprising: a processor configured to, when operated, carry out the network quality detection method according to claim 8.

15. A computer device, comprising,
at least one processor; and
a storage device having at least one program stored thereon, wherein
when executed by the at least one processor, the at least one program causes the at least one processor to implement the network quality detection method according to claim 8.

16. A non-transitory computer readable medium having a computer program stored thereon, wherein the computer program, when executed, implements the network quality detection method according to claim 8.

* * * * *